United States Patent
Cosareanu et al.

(10) Patent No.: US 12,106,144 B2
(45) Date of Patent: Oct. 1, 2024

(54) SYSTEMS AND METHODS FOR DYNAMICALLY BINDING ROBOTIC PROCESS AUTOMATION (RPA) ROBOTS TO RESOURCES

(71) Applicant: UiPath Inc., New York, NY (US)

(72) Inventors: Marius T Cosareanu, Buchare (RO); Ovidiu Constantin, Buchare (RO); Remus Rusanu, Buchare (RO); Mircea Grigore, Buchare (RO)

(73) Assignee: UiPath Inc., New York, NY (US)

( * ) Notice: Subject to any disclaimer, the term of this patent is extended or adjusted under 35 U.S.C. 154(b) by 421 days.

(21) Appl. No.: 17/453,805

(22) Filed: Nov. 5, 2021

(65) Prior Publication Data
US 2023/0143922 A1    May 11, 2023

(51) Int. Cl.
*G06F 9/48* (2006.01)
*G05B 19/042* (2006.01)
*G06F 9/451* (2018.01)

(52) U.S. Cl.
CPC ....... *G06F 9/4881* (2013.01); *G05B 19/0426* (2013.01); *G06F 9/451* (2018.02); *G05B 2219/23258* (2013.01)

(58) Field of Classification Search
CPC ... G06F 9/451; G06F 9/4881; G05B 19/0426; G05B 2219/23258
See application file for complete search history.

(56) References Cited

U.S. PATENT DOCUMENTS

| | | | |
|---|---|---|---|
| 8,504,803 B2 | 8/2013 | Shukla | |
| 2014/0201138 A1* | 7/2014 | Dorman | G06F 16/178 707/610 |
| 2020/0310844 A1* | 10/2020 | Dennis | H04L 63/083 |
| 2021/0129325 A1 | 5/2021 | Yu et al. | |

FOREIGN PATENT DOCUMENTS

| | | |
|---|---|---|
| CN | 111427676 A | 7/2020 |
| CN | 112035101 A | 12/2020 |
| CN | 113110867 A | 7/2021 |

OTHER PUBLICATIONS

Robocorp, Running Robots in Robocorp Lab, available at https://robocorp.com/docs/developer-tools/robocorp-lab/running-robots, Aug. 19, 2021.
RPA Forum, Session Variables, available at https://www.rpaforum.net/threads/session-variables.11751/, Jun. 25-26, 2019.
Appian, Configure a Robotic Process, available at https://docs.appian.com/suite/help/21.2/rpa-7.7/create/configuring-a-robotic-process.html, downloaded on Aug. 5, 2021.
Kofax, Configure Variables, available at https://docshield.kofax.com/RPA/en_US/11.1.0_vwsnqu4c9o/help/kap_help/designstudio/t_configuringvariables.html, downloaded on Aug. 5, 2021.

* cited by examiner

*Primary Examiner* — Wissam Rashid
(74) *Attorney, Agent, or Firm* — Law Office of Andrei D Popovici, PC

(57) ABSTRACT

In some embodiments, a workflow specification includes a set of default characteristics of a resource required by a robotic process automation (RPA) robot tasked with executing the respective workflow. Some embodiments enable a user to change the respective default characteristics (e.g., relocate and/or rename a file) without changing the workflow specification per se. Such changes may be performed via a user interface of an RPA orchestrator managing the execution of multiple RPA robots.

21 Claims, 11 Drawing Sheets

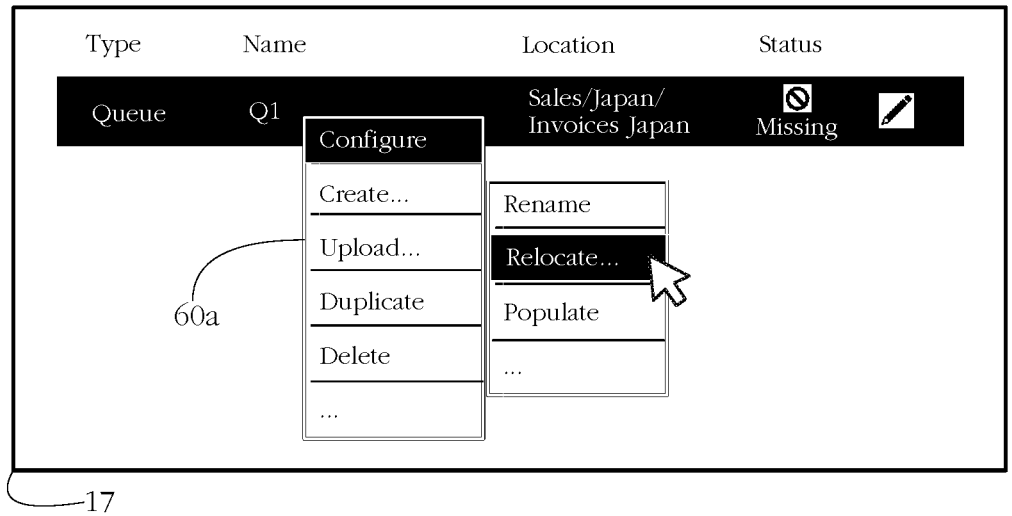
FIG. 8-A
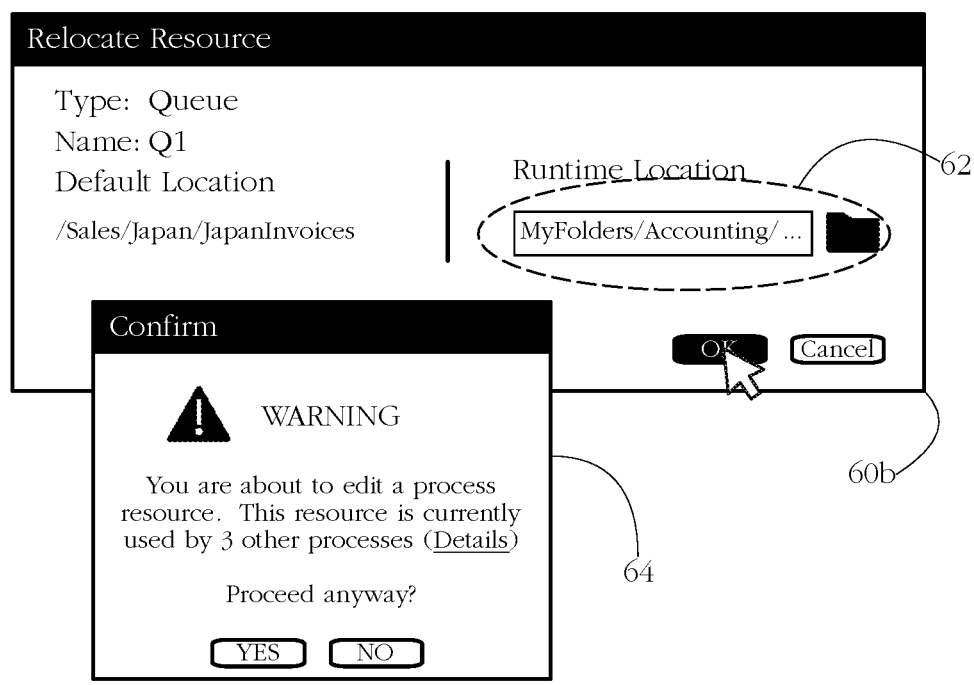
FIG. 8-B

SYSTEMS AND METHODS FOR DYNAMICALLY BINDING ROBOTIC PROCESS AUTOMATION (RPA) ROBOTS TO RESOURCES

BACKGROUND

The invention relates to robotic process automation (RPA), and in particular to managing the execution of software robots.

RPA is an emerging field of information technology aimed at improving productivity by automating repetitive computing tasks, thus freeing human operators to perform more intellectually sophisticated and/or creative activities. Notable tasks targeted for automation include extracting structured data from documents (e.g., invoices, webpages) and interacting with user interfaces, for instance to fill in forms, send email, and post messages to social media sites, among others.

A distinct prong of RPA development is directed at simplifying the programming and management of software robots, with the ultimate goal of extending the reach of RPA technology to a broad audience of developers and industries. One way conventional RPA is currently being carried out comprises employing an RPA design tool to program a set of robotic activities. The resulting robot code or specification is then sent to an execution environment (a client's machine). In more sophisticated applications, multiple robots may execute concurrently on multiple machines, carrying out various automation tasks. The execution of such robots may be managed and coordinated centrally from an administration console.

The design and exploitation of RPA robots are essentially distinct activities, typically carried out by distinct entities (users, companies). Therefore, in conventional RPA architectures a smooth operation may require the collaboration of multiple entities and operators. For instance, a client may not be able to troubleshoot a robot on his/her own, and some runtime malfunctions may require assistance from the robot designer. Such situations may negatively affect productivity and may even discourage some clients from adopting RPA technologies.

In view of the above, there is a strong interest in developing more robust and user-friendly RPA robots.

SUMMARY

According to one aspect, a method comprises employing at least one hardware processor of a computer system to execute a robotic process automation (RPA) orchestrator configured to manage a plurality of software robots. The RPA orchestrator is further configured to receive an RPA package comprising an encoding of an RPA workflow and an indicator of a default location of an RPA resource required by the RPA workflow, wherein the RPA resource comprises an item selected from a group consisting of a computer file, a queue, and a database. The RPA orchestrator is further configured to assign the RPA workflow for execution to a selected robot of the plurality of software robots, wherein assigning the RPA workflow to the selected robot comprises, in preparation for executing the RPA workflow, determining whether a runtime instance of the RPA resource is available at the default location, and exposing an orchestrator user interface (UI) to a user, the orchestrator UI displaying a resource availability indicator selected according to a result of the determination.

According to another aspect, a computer system comprises at least one hardware processor configured to execute an RPA orchestrator configured to manage a plurality of software robots The RPA orchestrator is further configured to receive an RPA package comprising an encoding of an RPA workflow and an indicator of a default location of an RPA resource required by the RPA workflow, wherein the RPA resource comprises an item selected from a group consisting of a computer file, a queue, and a database. The RPA orchestrator is further configured to assign the RPA workflow for execution to a selected robot of the plurality of software robots, wherein assigning the RPA workflow to the selected robot comprises, in preparation for executing the RPA workflow, determining whether a runtime instance of the RPA resource is available at the default location, and exposing an orchestrator user interface (UI) to a user, the orchestrator UI displaying a resource availability indicator selected according to a result of the determination.

According to another aspect, a non-transitory computer-readable medium stores instructions which, when executed by at least one hardware processor of a computer system, cause the computer system to execute an RPA orchestrator configured to manage a plurality of software robots. The RPA orchestrator is further configured to receive an RPA package comprising an encoding of an RPA workflow and an indicator of a default location of an RPA resource required by the RPA workflow, wherein the RPA resource comprises an item selected from a group consisting of a computer file, a queue, and a database. The RPA orchestrator is further configured to assign the RPA workflow for execution to a selected robot of the plurality of software robots, wherein assigning the RPA workflow to the selected robot comprises, in preparation for executing the RPA workflow, determining whether a runtime instance of the RPA resource is available at the default location, and exposing an orchestrator user interface (UI) to a user, the orchestrator UI displaying a resource availability indicator selected according to a result of the determination.

BRIEF DESCRIPTION OF THE DRAWINGS

The foregoing aspects and advantages of the present invention will become better understood upon reading the following detailed description and upon reference to the drawings where:

FIG. 8-A shows an exemplary resource editing UI according to some embodiments of the present invention.

FIG. 8-B shows another exemplary resource editing UI displaying a warning to the user according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Metadata herein encompasses any data that provides information about an object, apart from the object itself. For instance, image metadata may include a size, a filename, and a location of the respective image, but not the image itself. Computer-readable media encompass non-transitory media such as magnetic, optic, and semiconductor storage media (e.g., hard drives, optical disks, flash memory, DRAM), as well as communication links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

The following description illustrates embodiments of the invention by way of example and not necessarily by way of limitation.

Figure 1:
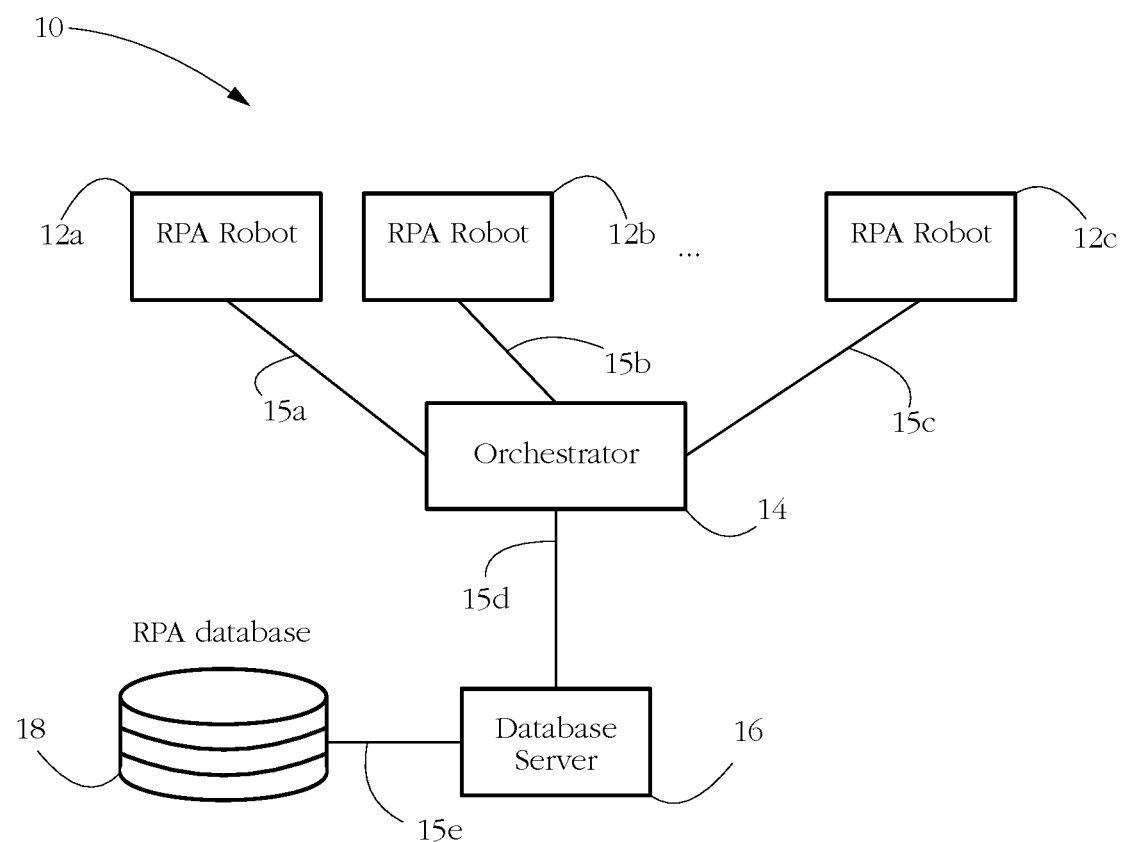
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, such as opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface (GUI) may comprise having the operating system move the mouse pointer to the respective button and generating a mouse click event, or may alternatively comprise toggling the respective GUI button itself to a clicked state.

Activities typically targeted for RPA automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 30 (FIG. 2) enables a human developer to design a software robot to implement a workflow that effectively automates a sequence of human actions. A workflow herein denotes a sequence of custom automation steps, herein deemed RPA activities. Each RPA activity includes at least one action performed by the robot, such as clicking a button, reading a file, writing to a spreadsheet cell, etc. Activities may be nested and/or embedded. In some embodiments, RPA design application 30 exposes a user interface and set of tools that give the developer control of the execution order and the relationship between RPA activities of a workflow. One commercial example of an embodiment of RPA design application 30 is UiPath StudioX®.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
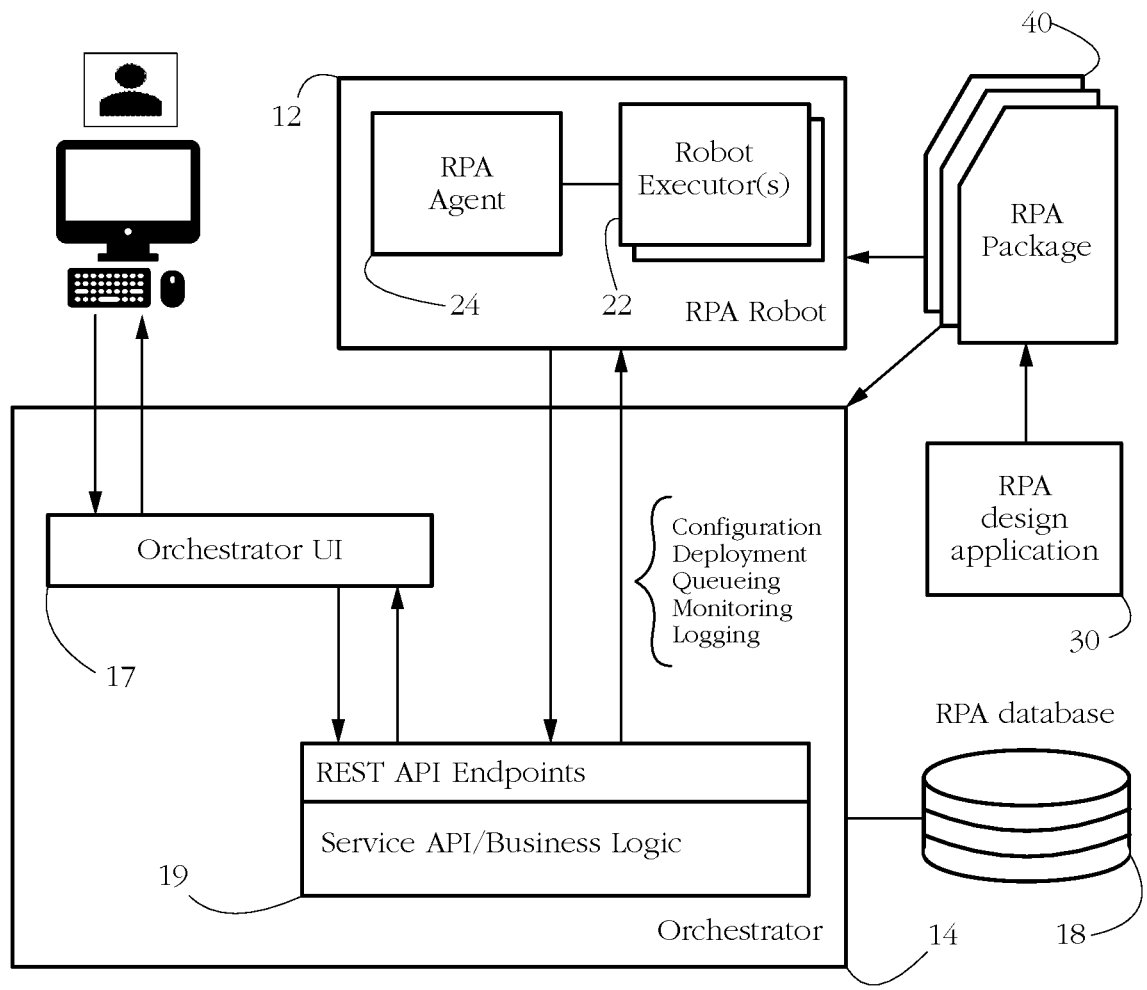
FIG. 2 illustrates exemplary components and operation of an RPA robot and orchestrator according to some embodiments of the present invention.
Figure 3:
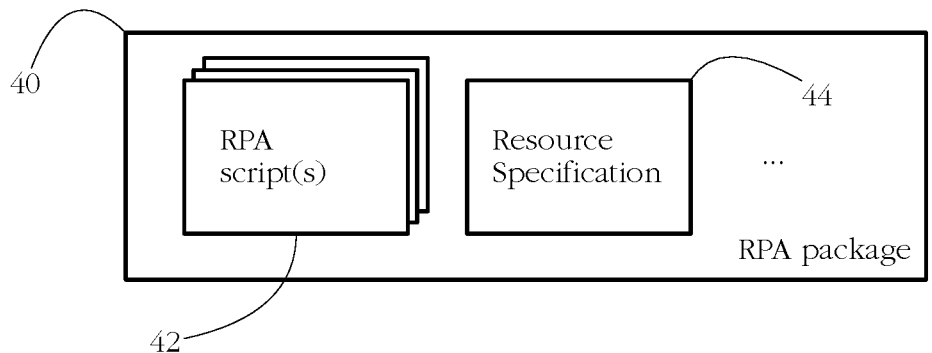
FIG. 3 illustrates exemplary components of an RPA package according to some embodiments of the present invention.

Once an RPA workflow is developed, it may be encoded in computer-readable form and exported as an RPA package 40 (FIG. 2). In some embodiments as illustrated in FIG. 3, RPA package 40 includes a set of RPA scripts 42 comprising set of instructions for a software robot. RPA script(s) 42 may be formulated according to any data specification known in the art, for instance in a version of an extensible markup language (XML), Javascript® Object Notation (JSON), or a programming language such as C#, Visual Basic®, Java®, etc. Alternatively, RPA script(s) 42 may be formulated in an RPA-specific version of bytecode, or even as a sequence of instructions formulated in a natural language such as English, Spanish, Japanese, etc. In some embodiments, RPA scripts(s) 42 are pre-compiled into a set of native processor instructions (e.g., machine code).

In some embodiments, RPA package 40 further comprises a resource specification 44 indicative of a set of process resources used by the respective robot during execution. Exemplary process resources include a set of credentials, a computer file, a queue, a database, and a network connection/communication link, among others. Credentials herein generically denote private data (e.g., username, password) required for accessing a specific RPA host machine and/or for executing a specific software component. Credentials may comprise encrypted data; in such situations, the executing robot may possess a cryptographic key for decrypting the respective data. In some embodiments, credential resources may take the form of a computer file. Alternatively, an exemplary credential resource may comprise a lookup key (e.g., hash index) into a database holding the actual credentials. Such a database is sometimes known in the art as a credential vault. A queue herein denotes a container holding an ordered collection of items of the same type (e.g., computer files, structured data objects). Exemplary queues include a collection of invoices and the contents of an email inbox, among others. The ordering of queue items may indicate an order in which the respective items should be processed by the executing robot.

In some embodiments, for each process resource, specification 44 comprises a set of metadata characterizing the respective resource. Exemplary resource characteristics/metadata include, among others, an indicator of a resource type of the respective resource, a filename, a filesystem path and/or other location indicator for accessing the respective resource, a size, and a version indicator of the respective resource. Resource specification 44 may be formulated according to any data format known in the art, for instance as an XML, or JSON script, a relational database, etc. Resource metadata is further discussed below, in relation to FIG. 8.

A skilled artisan will appreciate that RPA design application 30 may comprise multiple components/modules, which may execute on distinct physical machines. In one example, RPA design application 30 may execute in a client-server configuration, wherein one component of application 30 may expose a robot design interface to a user of a client computer, and another component of application 30 executing on a server computer may assemble the robot workflow and formulate/output RPA package 40. For instance, a developer may access the robot design interface via a web browser executing on the client computer, while the software processing the user input received at the client computer actually executes on the server computer.

Once formulated, RPA script(s) 42 may be executed by a set of robots 12*a-c* (FIG. 1), which may be further controlled and coordinated by an orchestrator 14. Robots 12*a-c* and orchestrator 14 may each comprise a plurality of computer programs, which may or may not execute on the same physical machine. Exemplary commercial embodiments of robots 12*a-c* and orchestrator 14 include UiPath Robots® and UiPath Orchestrator®, respectively. Types of robots 12*a-c* include, but are not limited to, attended robots, unattended robots, development robots (similar to unattended robots, but used for development and testing purposes), and nonproduction robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 controls and coordinates the execution of multiple robots 12*a-c*. As such, orchestrator 14 may have various capabilities including, but not limited to, provisioning, deployment, configuration, scheduling, queueing, monitoring, logging, and/or providing interconnectivity for robots 12*a-c*. Provisioning may include creating and maintaining connections between robots 12*a-c* and orchestrator 14. Deployment may include ensuring the correct delivery of software (e.g, RPA scripts 42) to robots 12*a-c* for execution. Configuration may include maintenance and delivery of robot environments, resources, and workflow configurations. Scheduling may comprise configuring robots 12*a-c* to execute various tasks according to specific schedules (e.g., at specific times of the day, on specific dates, daily, etc.). Queueing may include providing management of job queues. Monitoring may include keeping track of robot state and maintaining user permissions. Logging may include storing and indexing logs to a database and/or another storage mechanism (e.g., SQL, ElasticSearch®, Redis®). Orchestrator 14 may further act as a centralized point of communication for third-party solutions and/or applications.

FIG. 2 shows exemplary components of a robot 12 and orchestrator 14 according to some embodiments of the present invention. An exemplary RPA robot 12 is constructed using a Windows® Workflow Foundation Application Programming Interface from Microsoft, Inc. Robot 12 may comprise a set of executors 22 and an RPA agent 24. Robot executors 22 are configured to receive RPA script(s) 42 indicating a sequence of RPA activities that mimic the actions of a human operator, and to automatically perform the respective sequence of activities on the respective client machine. In some embodiments, robot executor(s) 22 comprise an interpreter (e.g., a just-in-time interpreter or compiler) configured to translate RPA script(s) 42 into a runtime object comprising processor instructions for carrying out the RPA activities encoded in the respective script(s). Executing script(s) 42 may thus comprise executor(s) 22 translating RPA script(s) 42 and instructing a processor of the respective host machine to load the resulting runtime package into memory and to launch the runtime package into execution.

RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12, orchestrator 14 and/or other entities.

In some embodiments executing in a Windows® environment, robot 12 installs a Microsoft Windows® Service Control Manager (SCM)-managed service by default. As a result, such robots can open interactive Windows® sessions under the local system account and have the processor privilege of a Windows® service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple concurrent interactive sessions (e.g., Windows® Server 2012), multiple robots may be running at the same time, each in a separate Windows® session, using different credentials. Such credentials may be supplied via RPA resource specification 44 (see above, in relation to FIG. 3).

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several jobs/workflows concurrently. RPA agent 24 (e.g., a Windows® service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14, for instance as a heartbeat signal. In turn, orchestrator 14 may use the channel to transmit acknowledgements, job requests, and other data such as RPA script(s) 42 and resource metadata to robot 12.

Orchestrator 14 may execute on a server side, possibly distributed over multiple physical and/or virtual machines. In one such embodiment, orchestrator 14 may include an orchestrator user interface (UI) 17 which may be a web application, and a set of service modules 19. Several examples of an orchestrator UI are discussed below. Service modules 19 may include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on a selected robot 12, creating robot groups/pools, assigning workflows to robots, adding/removing data to/from queues, scheduling jobs to run unattended, analyzing logs per robot or workflow, etc. Orchestrator UI 17 may use Hypertext Markup Language (HTML), JavaScript (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and/or configure users, robots, permissions, credentials and/or other process resources, etc. Logging REST endpoints may be used to log different information, such as errors, explicit messages sent by the robots, and other environment-specific information, for instance. Deployment REST endpoints may be used by robots to query the version of RPA script(s) 42 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various individual robots or robot pools, as well as data characterizing workflows executed by various robots, data associating workflows with the robots tasked with executing them, data characterizing users, roles, schedules, queues, etc. Another exemplary category of data stored and/or retrieved by database server 16 includes data characterizing the current state of each executing robot. Another exemplary data category stored and/or retrieved by database server 16 includes RPA resource metadata characterizing RPA resources required by various workflows, for instance default and/or runtime values of various resource attributes such as filenames, locations, credentials, etc. Yet another exemplary category of data includes messages logged by various robots during execution. Database server 16 and database 18 may employ any data storage protocol and format known in the art, such as structured query language (SQL), ElasticSearch®, and Redis®, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15a-e interconnecting various members of environment 10. Such links may be implemented according to any method known in the art, for instance as virtual network links, virtual private networks (VPN), or end-to-end tunnels. Some embodiments further encrypt data circulating over some or all of links 15a-e.

Figure 4:
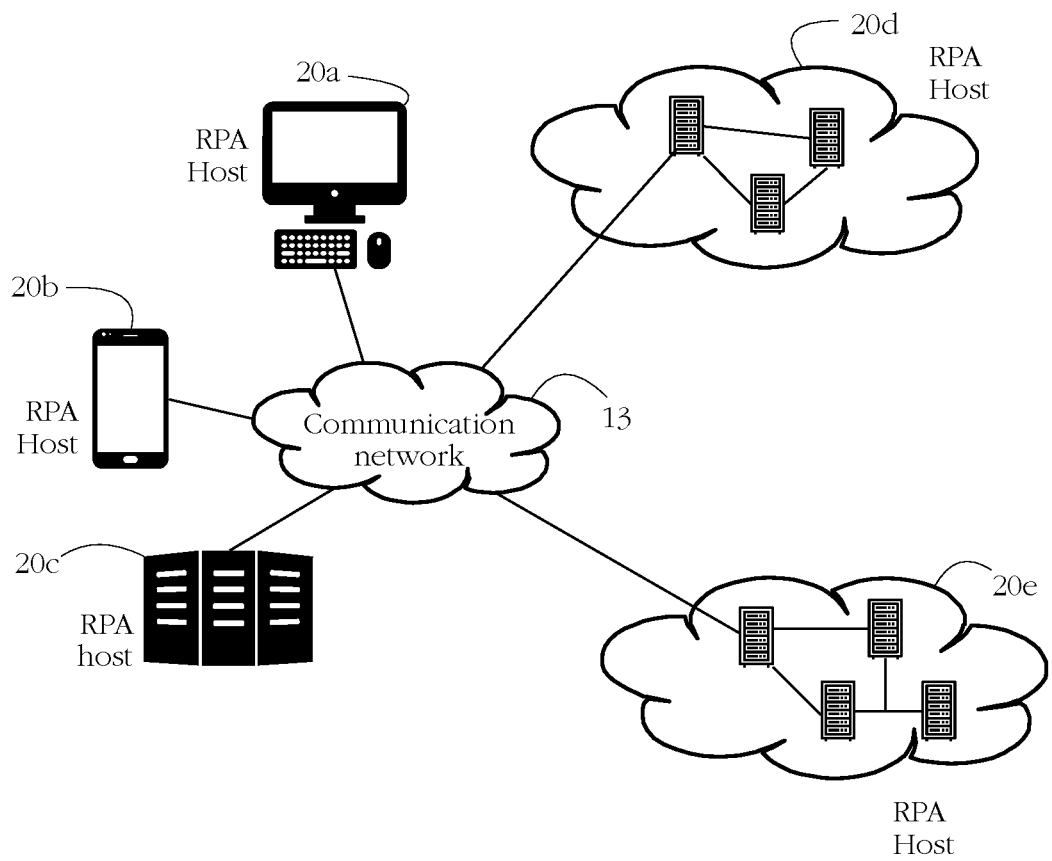
FIG. 4 shows a variety of RPA host systems according to some embodiments of the present invention.

A skilled artisan will understand that various components of RPA environment 10 may be implemented and/or may execute on distinct host computer systems (physical appliances and/or virtual machines). FIG. 4 shows a variety of such RPA host systems 20a-e according to some embodiments of the present invention. Each host system 20a-e represents a computing system (an individual computing appliance or a set of interconnected computers) having at least a hardware processor and a memory unit for storing processor instructions and/or data. Exemplary RPA hosts 20a-c include corporate mainframe computers, personal computers, laptop and tablet computers, mobile telecommunication devices (e.g., smartphones), and e-book readers, among others. Other exemplary RPA hosts illustrated as items 20d-e include a cloud computing platform comprising a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the Azure® SDK and AWS® SDK, among others. RPA hosts 20a-e may be communicatively coupled by a communication network 13, such as the Internet.

Figure 5:
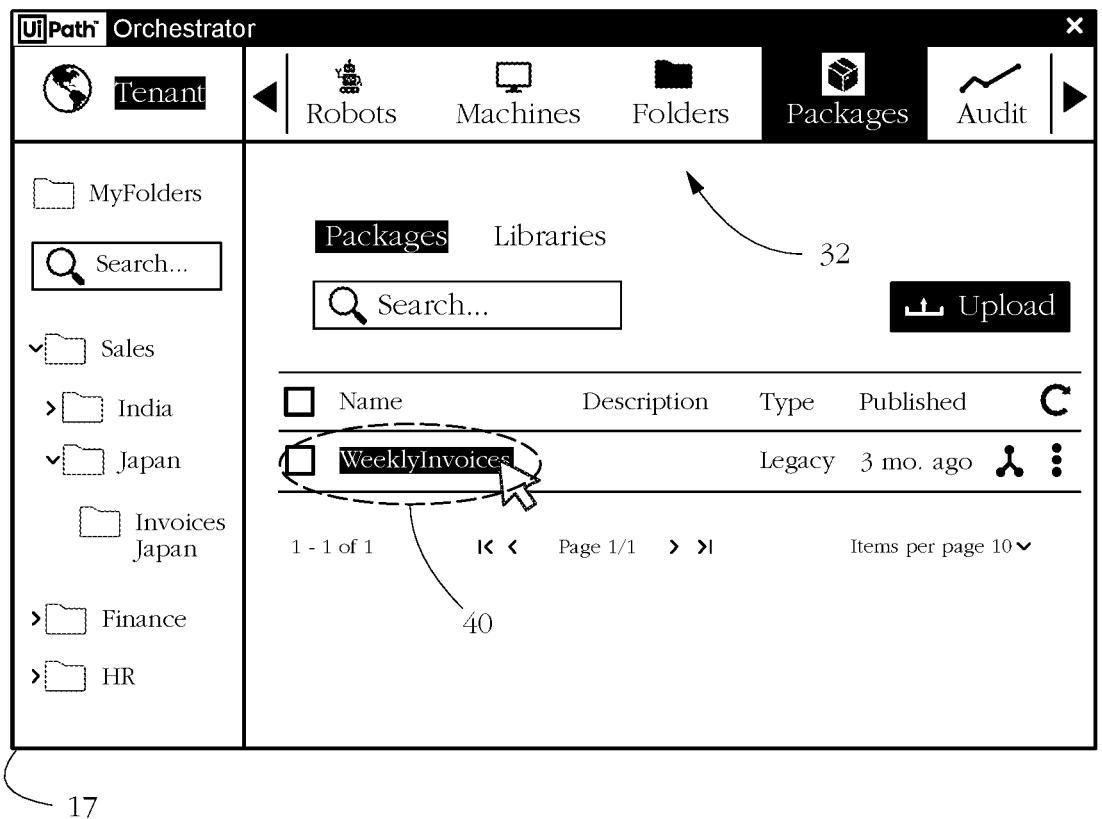
FIG. 5 shows an exemplary view exposed by an orchestrator user interface (UI) according to some embodiments of the present invention.

FIG. 5 shows an exemplary view exposed by an orchestrator UI 17 according to some embodiments of the present invention. UI 17 may comprise a menu area 32 enabling the user to set up and configure various aspects of RPA, for instance manage individual instances of robots 12a-c, assign robots 12a-c to specific machines (RPA hosts 20a-e in FIG. 4), upload and configure RPA packages 40, locate or create various process resources, etc. The exemplary view illustrated in FIG. 5 is configured for package management. In some embodiments, RPA packages 40 (see also FIGS. 2 and 3, for instance) are uploaded to orchestrator 14 by the developer of the respective packages and/or by an administrator of orchestrator 14. Exemplary UI 17 may list uploaded packages 40 and expose a control for uploading additional packages. In some embodiments, clicking on an individual package name/icon may allow a user to further explore the contents of and/or to configure the respective package. In one such example, clicking on a package name (e.g., 'WeeklyInvoices' in FIG. 5) exposes a sub-menu and/or an additional user interface listing resources required by the respective workflow, further showing various metadata characterizing each resource (e.g., the default and/or runtime location of each resource).

Figure 6:
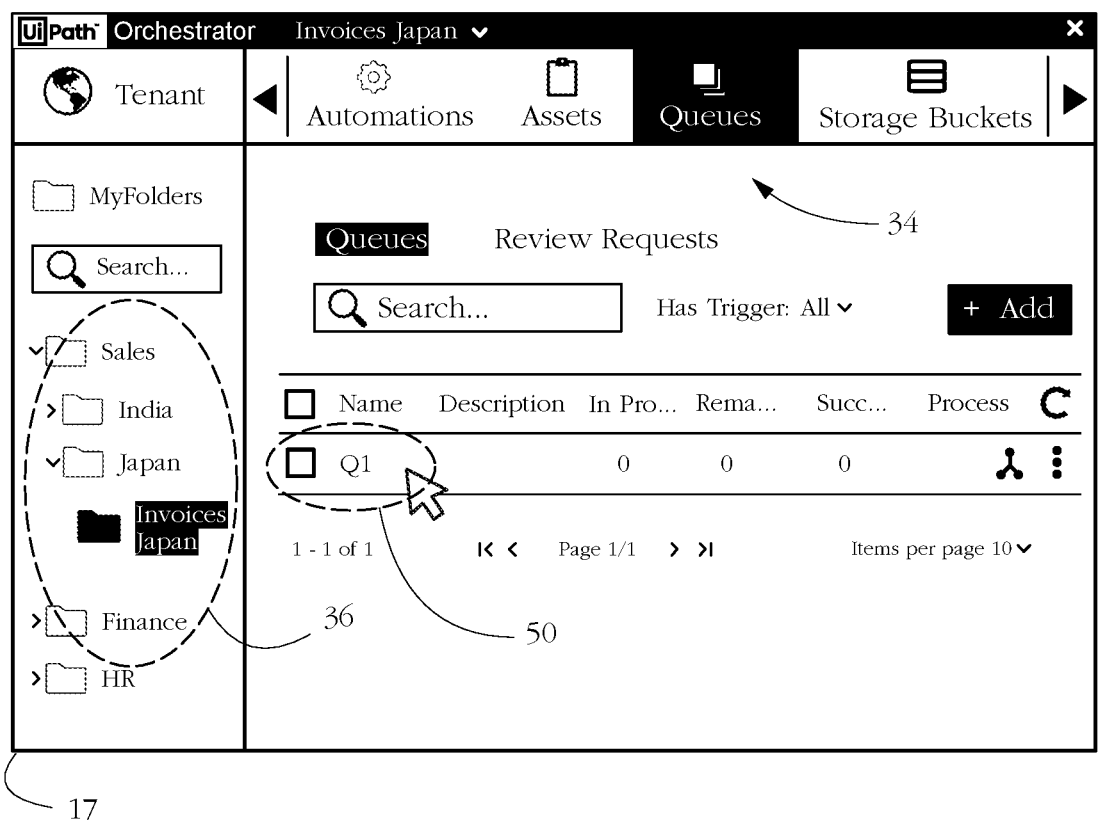
FIG. 6 shows another exemplary view exposed by the orchestrator UI according to some embodiments of the present invention.

FIG. 6 shows another exemplary view exposed by orchestrator UI 17 according to some embodiments of the present invention, the illustrated view enabling the management of RPA resources, i.e., of resources required for execution of various workflows. UI 17 may expose a menu 34 enabling the user to list resources by type (e.g., Queues, Files, Credentials, etc.), and/or another menu 36 enabling the user to list resources by location. Location menu 36 may comprise a set of icons and/or user-facing location names, for instance arranged as a file system comprising folders and subfolders, as illustrated in FIG. 6. The term 'user-facing name' is used herein to indicate an on-screen name, alias, or label displayed to the user, as opposed to an actual filename or storage/network location. Some user-facing names may coincide with actual filenames, filesystem paths or network addresses. Each menu item of location menu 36 (such as the folder identified by the user-facing name 'InvoicesJapan') may represent a distinct storage location, for instance a distinct folder of a local or remote filesystem, or an addressable unit of a memory or storage medium. Said storage location may be part of, or may be communicatively coupled to, the RPA host system which executes the robot currently tasked with executing the respective workflow.

In some embodiments, location names displayed by menu 36 may represent default location names for the respective resource(s), i.e., location names indicated by the developer of the respective RPA workflow at design time and included in resource specification 44. In other embodiments, the displayed location names represent runtime location names, i.e., user-facing names of locations where the respective resources actually reside when the respective workflow is executed. As will be further described below, a runtime location of a resource may or may not coincide with the default location indicated by the developer. In some embodiments, resources may be renamed and/or relocated by a user of orchestrator UI 17, as shown in detail below. In yet another exemplary embodiment, menu 36 may display both default and runtime locations for each resource.

For each listed resource 50, UI 17 may display a plurality of characteristics of the respective resource. In the exemplary case of a queue, characterizing attributes may comprise a user-facing name of the respective queue ('Q1' in FIG. 6), and various resource usage data such as a list of robots/processes that use the respective queue, a default and/or a runtime location of the respective queue, a total count of queue items in the respective queue, a count of queue items that have been successfully processed so far, etc. Some of the displayed information may be determined according to resource metadata defined in a resource specification 44 of an associated RPA package.

In some embodiments, clicking, tapping (or otherwise activating) a selected resource in the exemplary view illustrated in FIG. 6 may expose a sub-menu or an additional user interface enabling the user to configure various aspects of the respective resource. Examples of such resource-editing UIs are shown below.

Figure 7:
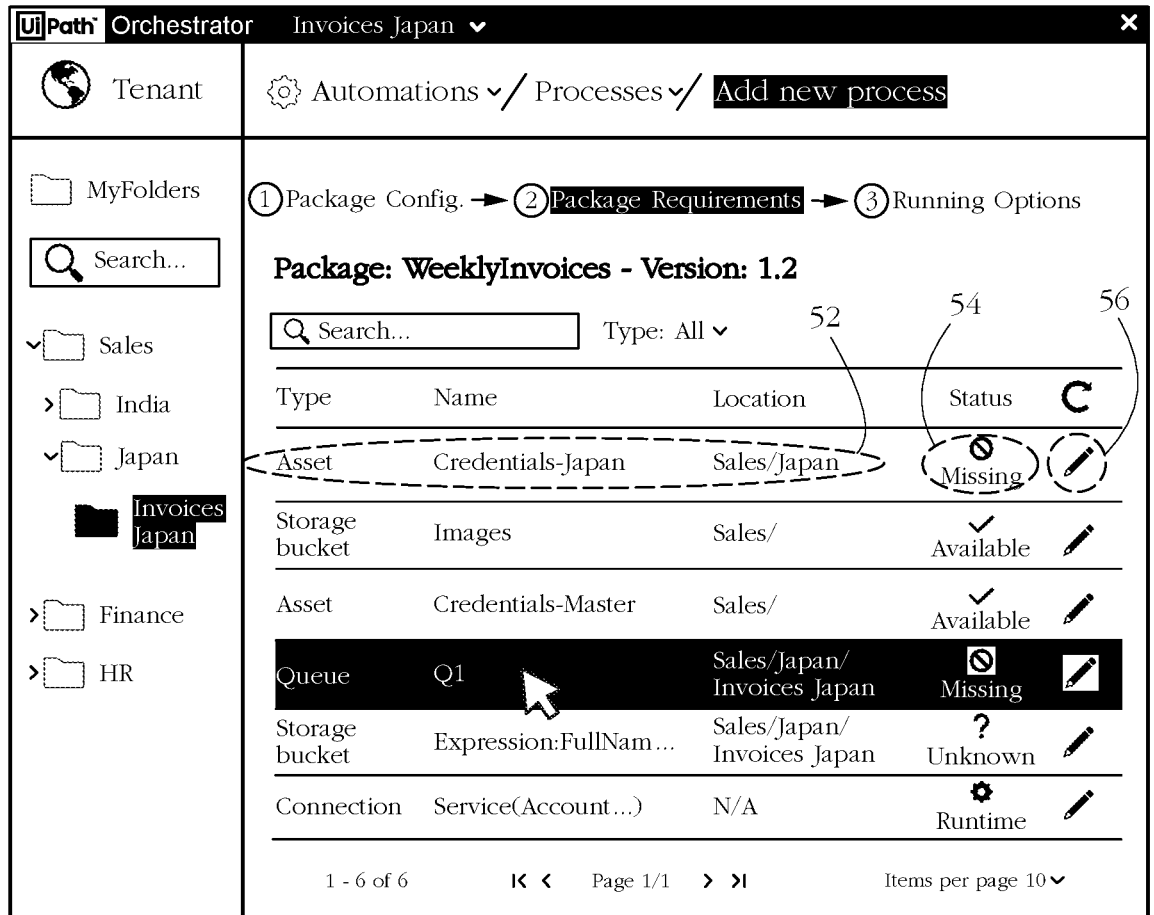
FIG. 7 shows yet another exemplary view exposed by the orchestrator UI according to some embodiments of the present invention.

FIG. 7 shows yet another exemplary view displayed by orchestrator UI 17 according to some embodiments of the present invention. The illustrated view may be displayed as part of a sequence of steps for configuring a robot for execution, for instance when creating a new RPA process. The term 'RPA process' herein denotes an association between a selected RPA robot (or the RPA host 20a-e that it executes on) and a selected workflow. Stated otherwise, creating an RPA process comprises assigning a selected workflow to a selected robot or machine.

In some embodiments, in response to receiving an RPA package, orchestrator 14 may parse the resource specification 44 of the respective package to identify resources which are required for a successful execution of the respective workflow. In one example of a workflow designed to extract data from invoices, the robot may require that a queue of invoices be present at a pre-determined location; otherwise, an attempt to execute the respective robot/workflow will typically result in an error. The respective queue is therefore regarded as a required resource of the respective workflow or robot. In an embodiment as illustrated in FIG. 7, orchestrator UI 17 may be configured to display to the user a list of required resources determined according to resource specification 44 of the RPA package associated with the respective workflow/RPA process currently under configuration. The display may take a tabular form, wherein each resource may be represented as a row of attribute values/metadata 52 characterizing the respective resource. Displayed metadata characterizing a resource may include, for instance, a resource type, a user-facing resource name, and a location of the respective resource. In exemplary embodiments, displayed resource metadata 52 may include a default location of the respective resource, a runtime location of the respective resource, or both.

In some embodiments, orchestrator UI 17 further displays an availability indicator 54 indicative of whether an instance of the respective resource is currently available at the runtime location. Availability indicator 54 may include a text label, a symbol (e.g., check mark, question mark, etc.), or an icon (e.g., emoji) suggestive of the respective situation (e.g., resource available, missing, unknown, etc.). Alternative embodiments may use semaphore-inspired graphics or symbols to indicate the respective situation. For instance, a missing resource may be indicated by a red dot, while an available resource may be indicated by a green dot, etc.

Some embodiments of orchestrator UI 17 further implement a resource-editing mechanism enabling a user of UI 17 to operate selected changes to a process resource. In one example as illustrated in FIG. 7, for each listed resource UI 17 includes a resource-editing control activated via a dedicated visual element 56, such as a clickable icon or text element. Some embodiments may only display element 56 for selected resource types, and/or in selected situations (e.g., when the respective resource is missing or incompletely configured). In another exemplary embodiments, the resource-editing mechanism (and/or associated display of visual element 56) may be activated only for selected resources, selected workflows, and/or selected robots/RPA hosts.

In some embodiments, activating a resource-editing control may cause UI 17 to display a separate resource-editing UI, as illustrated in FIGS. 8-A-B. FIG. 8-A illustrates a resource-editing menu 60*a* having a set of menu items that enable the user to carry out various activities in relation to the respective process resource. In the illustrated example of a queue, the menu comprises, among others, options for creating a queue object with the required properties, uploading items to the queue, duplicating, and deleting the respective queue object. FIG. 8-A further shows how selecting an exemplary menu item for configuring the respective resource may open an additional submenu, which enables the user to rename and/or to relocate the respective resource, for instance. In this context, relocating a resource refers to redirecting the executing robot to look for the respective resource at a new location, as opposed to actually moving the respective resource to the new location. In some embodiments, relocation comprises changing resource metadata such as a filename and/or a location indicator (e.g., filesystem path) to point to the new, runtime location.

FIG. 8-B shows an exemplary resource-editing UI 60*b* enabling the user to relocate a selected process resource. UI 60*b* may display various default characteristics of the respective resource (i.e., default values set at design time and specified in RPA package 40) such as a default resource name and default location, and may further display a control such as a form field 62 where the user may input a runtime location indicator for the respective resource. In some embodiments as illustrated in FIG. 8-B, an attempt to edit a process resource may cause UI 17 to display a warning dialog 64 to the user, indicating whether other currently configured RPA processes will be affected by the changes, and requesting a confirmation from the user in order to effect the changes. Some embodiments may further display identifying data (e.g., process IDs, names, etc.) of the affected processes and display various additional information, offer help or guidance, etc.

Exemplary resource-editing operations in the case of a file resource may include, for instance, creating an instance of the respective file at the default location, renaming the respective file, relocating the file (i.e., redirecting the robot to a new location), duplicating the file, and deleting the file. For other resource types, such as a network connection/communication link, resource-editing operations may include creating the respective connection and re-configuring various parameters (e.g., identifier of a remote connection peer, VPN credentials, etc.).

Other exemplary implementations of the resource-editing mechanism may include enabling the user to change a text attribute value (e.g., user-facing name) by clicking/tapping the currently displayed value and overwriting it. In another example, UI 17 may enable the user to relocate a resource by clicking/tapping its user-facing name and dragging to an item (e.g., folder) selected from location menu 36 (FIG. 6). In such examples, the UI element displaying the resource name may constitute the resource-editing control.

Figure 9:
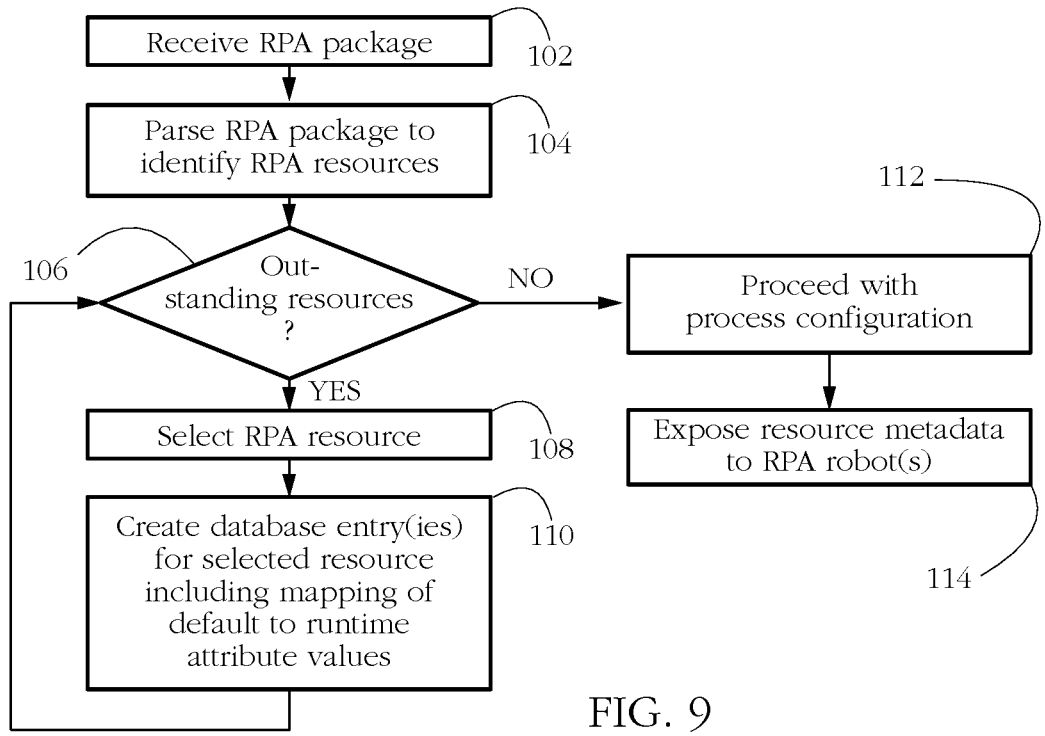
FIG. 9 shows an exemplary sequence of steps performed by the orchestrator according to some embodiments of the present invention.

FIG. 9 shows an exemplary sequence of steps performed by the orchestrator according to some embodiments of the present invention. In a typical RPA deployment scenario, the developer uses RPA design application 30 to design a workflow, e.g., a sequence of robotic activities for extracting specific data from a queue of invoices. In some embodiments, design application outputs RPA package 40 comprising an encoding of the respective robotic activities (RPA scripts 42) and a resource specification 44, as shown in FIG. 3. RPA package 40 is then typically uploaded to an RPA host system 20*a*-*e* executing orchestrator 14 and/or RPA robot(s) 12.

In response to receiving package 40 (step 102), in a step 104 orchestrator 14 may parse specification 44 to identify RPA resources, i.e., resources required by an RPA robot to successfully execute the respective workflow. In the selected example, required RPA resources may include a queue object or an indicator of a location (e.g., filesystem folder) storing the invoices to be processed. Orchestrator 14 may then cycle through all identified resources (steps 106-108-110) to set up various data structures which will be later used by orchestrator 14 and/or the executing robot in managing the respective resources.

Figure 10:
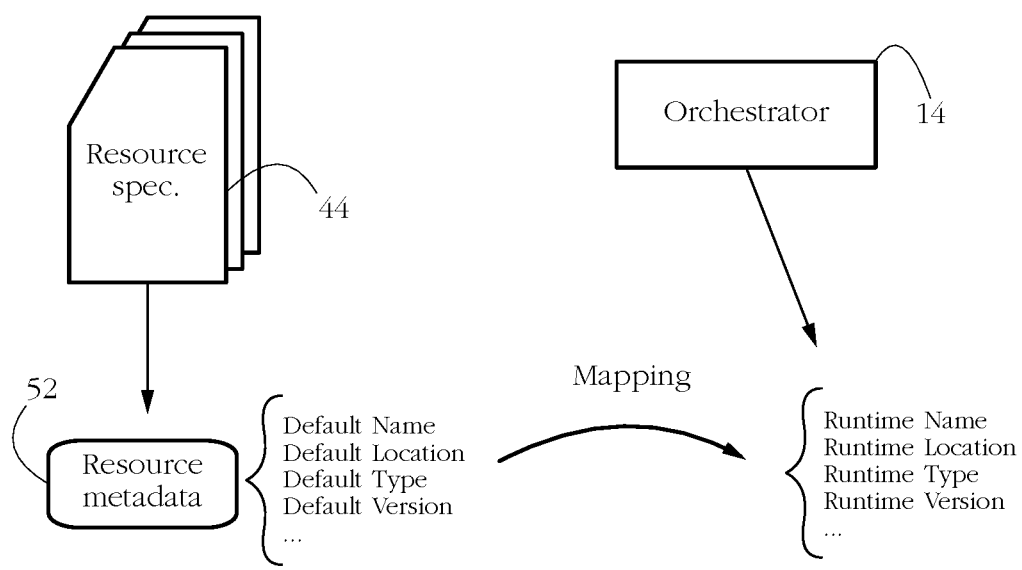
FIG. 10 illustrates a set of resource metadata and an exemplary mapping between default and runtime attribute values, according to some embodiments of the present invention.

In some embodiments, step 110 comprises determining a set of resource characteristics, i.e., metadata characterizing the respective resource, such as a name and a location of the respective resource. Some such metadata are included in specification 44; other items may be derived from information included in resource specification 44 and possibly according to other data. FIG. 10 illustrates exemplary resource metadata 52 according to some embodiments of the present invention. Metadata 52 may include a set of default (or design-time) metadata and a set of runtime metadata. Design-time metadata comprises characteristics of the respective resource that were set at design time, i.e., when the respective workflow was created. Design-time metadata are also herein deemed default metadata. For instance, the developer may indicate a default name of a resource (e.g., a queue called 'Q1' in FIGS. 6-7), and/or a default location of the respective resource. Again, with reference to the example illustrated in FIGS. 6-7, the default location of queue Q1 may be in the 'InvoicesJapan' folder.

In contrast to such default characteristics included in resource specification 44, runtime resource metadata characterize a runtime instance of the respective resource. For example, the name and/or location of the runtime instance may differ from the default ones, for various reasons further outlined below. In some embodiments, orchestrator 14 may create a set of runtime metadata and set the initial values of the respective attribute values to equal the corresponding default/design-time ones. For instance, the initial runtime location may be identical to the default location. Some embodiments then enable a user of orchestrator UI 17 to change the runtime values at subsequent times, for instance via resource-editing UI controls as described herein.

In some embodiments, step 110 may further create a set of database entries associated with the respective resource, the entry(ies) stored in RPA database 18 (FIGS. 1-2) and comprising resource metadata 52. Orchestrator 14 may further set up a mapping between corresponding default and runtime attribute values, thus enabling orchestrator 14 and/or an RPA robot tasked with executing the respective workflow to resolve the respective runtime values on the basis of the default values, or vice versa. A mapping herein generically denotes any means of associating a default value of a selected attribute with its corresponding runtime value (for instance the default location of a resource with the runtime location of the respective resource). An exemplary mapping may comprise a database entry (e.g., a row of a table) wherein the default and runtime attribute values are connected by the same lookup index (e.g., row label, resource name, etc.). A skilled artisan will appreciate that there may be many ways of technically achieving such a mapping, and that the given example is not meant to be limiting.

In response to creating resource-management data for all resources indicated in package 40, in a step 112 orchestrator 14 may proceed with other configuration activities, for instance to assign a selected robot to execute the respective workflow (thus defining an RPA process), to schedule jobs and to perform process evaluation/monitoring activities. In a further step 114 orchestrator 14 may make resource metadata available to the RPA robot tasked with executing the respective workflow and/or to any robot which may require access to at least one resource specified in RPA package 40. Step 114 may comprise any method of communicating data, such as via an exchange of client-server messages, as described above in relation to FIG. 2.

Figure 11:
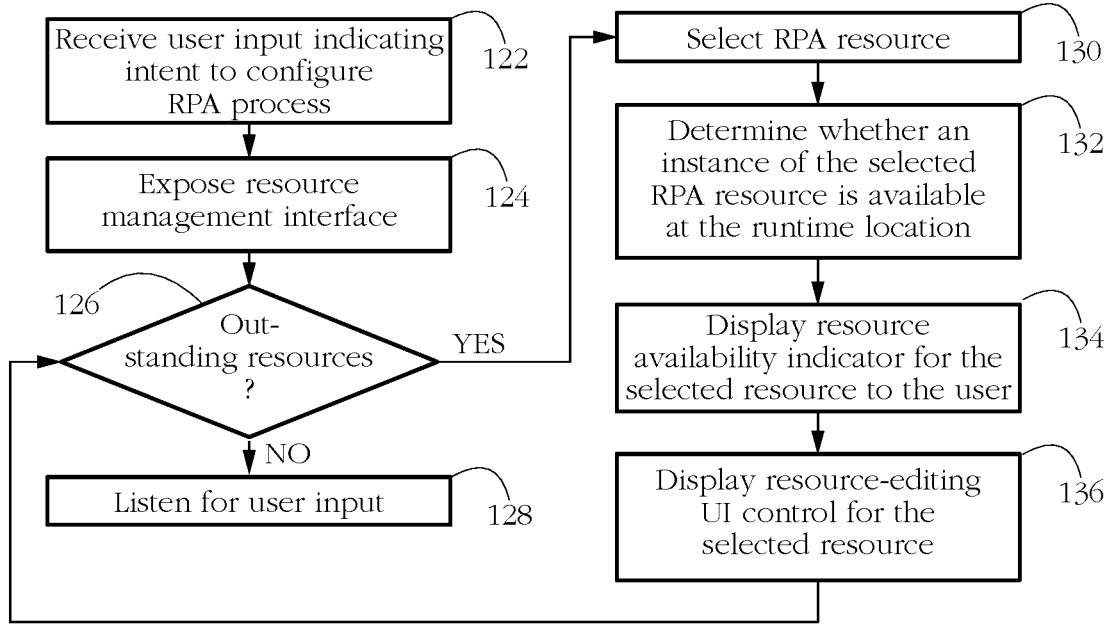
FIG. 11 shows another exemplary sequence of steps performed by the orchestrator according to some embodiments of the present invention.

FIG. 11 shows an exemplary sequence of steps performed by orchestrator 14 according to some embodiments of the present invention. The illustrated sequence of steps may be carried out for instance as part of an initial process configuration (i.e., assigning a selected workflow for execution on a selected robot), or at any later time when the user decides to re-configure an existing RPA process. In response to receiving a user input indicating an intent to configure a selected process (step 122), in a step 124 orchestrator 14 may expose a resource management interface such as the exemplary GUI illustrated in FIG. 7. Orchestrator 14 may then cycle through a sequence of steps 130-132-134-136 for each RPA resource required by the respective workflow. In response to selecting a resource (step 130), a step 132 may determine whether an object with the required runtime characteristics of the respective resource is currently available to the robot tasked with executing the respective workflow. In the example where the respective resource comprise a file, step 132 may determine whether a file having the runtime filename of the respective resource exists at the runtime location of the respective resource. To determine various default and/or runtime characteristics of the respective resource, step 132 may comprise looking up selected entries associated with the respective resource in RPA database 18.

For each currently selected RPA resource, a step 134 may display an availability indicator, for instance item 54 as illustrated in FIG. 7. A further step 136 may display a resource-editing UI control enabling the user to change various characteristics of the selected resource. See e.g., control 56 in FIG. 7 and associated description above.

Figure 12:
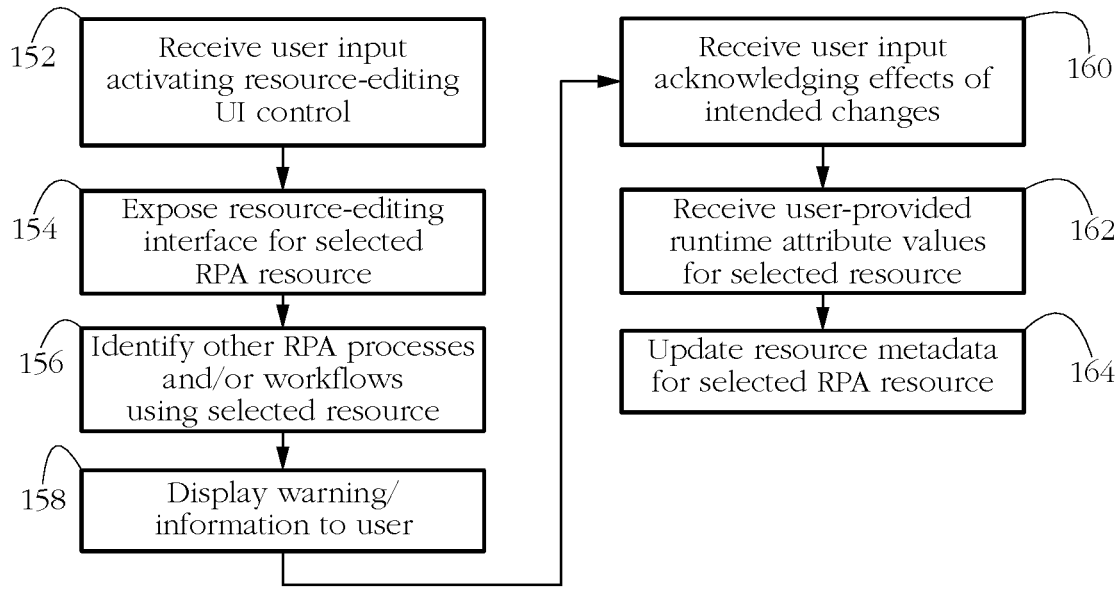
FIG. 12 shows an exemplary sequence of steps performed by an orchestrator to update resource metadata according to some embodiments of the present invention.

FIG. 12 illustrates an exemplary sequence of steps carried out by orchestrator 14 to enable the user to perform such changes according to some embodiments of the present invention. In a step 152, orchestrator 14 may receive a user input activating a resource-editing UI control (e.g., the user clicks/taps control 56 in FIG. 7). In response, some embodiments may expose a resource-editing interface, such as the exemplary interfaces illustrated in FIGS. 8-A-B. In some such embodiments, a sequence of steps 156-158 may determine whether editing a selected resource will affect other RPA processes and display a warning when yes. Step 156 may include looking up RPA database 18 for specific entries associating workflows and/or RPA resources with robots to identify other processes or robots configured to use the respective RPA resource. Step 158 may display to the user a warning (e.g., dialog window 64 in FIG. 8-B) and/or descriptive information about such entities identified in step 156.

In response to receiving in a step 160 a user input acknowledging the effect of editing the respective resource (e.g., in response to the user clicking/tapping 'YES' in dialog window 64), a step 162 may receive user-provided runtime attribute values for various characteristics such as a user-facing name, a filename, a location, and a version of the respective resource, among others. In a further step 164, orchestrator 14 may update runtime metadata associated with the respective resource in RPA database 18.

Figure 13:
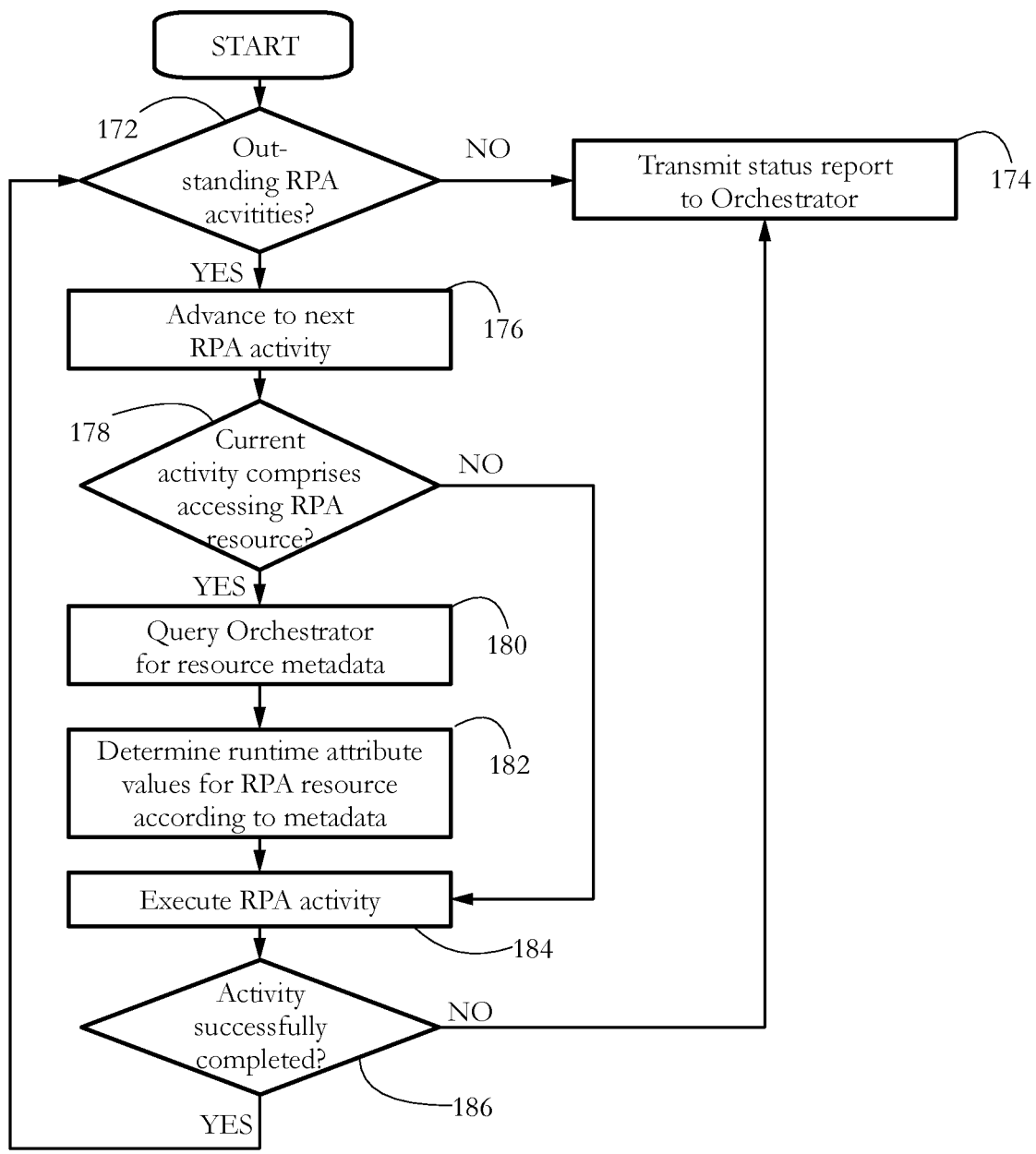
FIG. 13 shows an exemplary sequence of steps performed by an RPA robot according to some embodiments of the present invention.

FIG. 13 shows an exemplary sequence of steps performed by RPA robot 12 (FIG. 2) tasked with executing a selected RPA workflow, according to some embodiments of the present invention. Robot 12 may cycle through all RPA activities making up the respective workflow. For each activity selected in a step 176, a step 178 may determine whether the current activity requires accessing an RPA resource. For illustrative purposes, the following paragraphs will describe an example wherein the current activity comprises accessing a file. The respective file is characterized as file X according to default metadata, and as file Y according to runtime metadata (e.g., the filename and/or location of the respective file have been changed by a user of orchestrator 14, as shown above).

When step 178 returns a yes, in a step 180 robot 12 may query orchestrator 14, e.g., service API(s) 19 in FIG. 2, for data characterizing the respective resource. A further step 182 may determine runtime characteristics/metadata of the respective resource. A skilled artisan will appreciate that steps 180-182 may be carried out in various ways, depending on which party actually determines the respective runtime metadata. In a preferred embodiment, orchestrator 14 may expose to robot 12 a mapping between default and runtime attribute values for the respective resource. Robot 12 may then actively use the respective mapping to determine runtime metadata according to the default characteristics of the respective resource as defined in RPA script 42 and/or specification 44. Stated otherwise, in such embodiments, robot 12 may query orchestrator 14 about file Y, i.e., using runtime characteristics of the respective resource. Such a modus operandi may be preferable because it maintains the conventional client-server roles of robot 12 and orchestrator 14, and does not charge orchestrator 14 with an additional burden of translating metadata.

In alternative embodiments, robot 12 may formulate a query to orchestrator 14 according to default characteristics of the respective resource (e.g., default filename, default location, etc.). In response, orchestrator 14 may use the default-to-runtime mapping to determine runtime characteristics of the respective resource, and respond with runtime metadata to robot 12. Stated otherwise, in such embodiments, robot 12 may request data characterizing file X, but receive data characterizing file Y.

In a step 184, robot 12 may execute the current RPA activity, which may include accessing the respective RPA resource (e.g., opening the respective Excel® file). A step 186 may determine whether the current activity completed successfully, and when yes, robot 12 may return to steps 172-174 to advance to the next activity in the workflow. When step 172 concludes that the respective workflow does not include any further activities, robot 12 may transmit a report to orchestrator 14 indicating a status of the respective job. Some embodiments also report to orchestrator 14 in case step 186 has determined that an error has occurred (e.g., robot 12 was unable to access a specific RPA resource). In turn, orchestrator 14 may calculate various process and/or resource management quantities/statistics according to a content of such reports, and display such information within orchestrator UI 17 (see e.g., resource usage data illustrated in FIG. 6).

Figure 14:
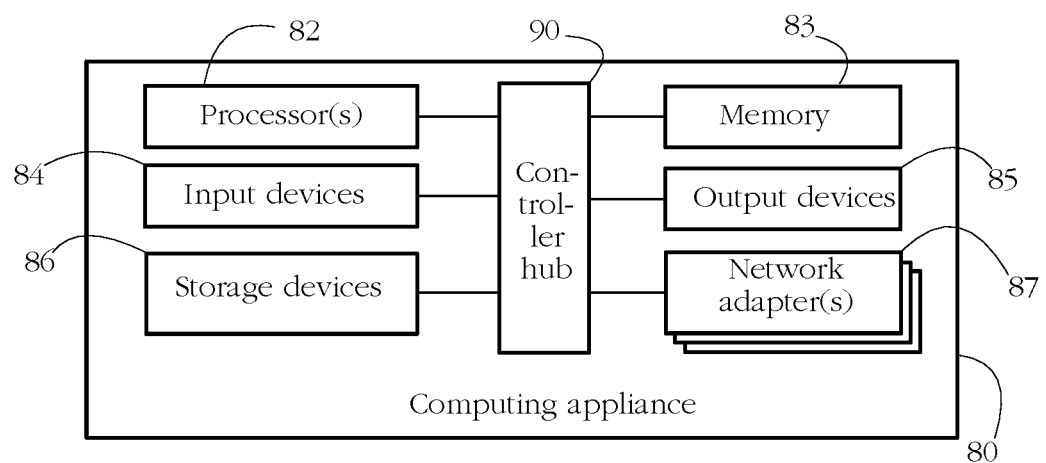
FIG. 14 shows an exemplary hardware configuration of a computing appliance programmed to execute some of the methods described herein.

FIG. 14 shows an exemplary hardware configuration of a computing appliance 80 programmed to execute some of the methods described herein. Appliance 80 may comprise any of RPA host platforms 20a-e (FIG. 4) configured to execute robots 12a-c and/or orchestrator 14 (FIG. 1). The illustrated appliance 80 is a personal computer; other computing devices such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 83 may comprise volatile computer-readable media (e.g. dynamic random-access memory—DRAM) storing data and/or instruction encodings accessed or generated by processor(s) 82 in the course of carrying out operations. Input devices 84 may include computer keyboards, mice, trackpads, and microphones, among others, including the respective hardware interfaces and/or adapters allowing a user to introduce data and/or instructions into appliance 80. Output devices 85 may include display devices such as monitors and speakers among others, as well as hardware interfaces/adapters such as graphic cards, enabling the respective computing device to communicate data to a user. In some embodiments, input and output devices 84-85 share a common piece of hardware (e.g., a touch screen). Storage devices 86 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 87 include mechanical, electrical, and signaling circuitry for communicating data over physical links coupled to an electronic communication network (e.g, network 13 in FIG. 4) and/or to other devices/computer systems. Adapter(s) 87 may be configured to transmit and/or receive data using a variety of communication protocols.

Controller hub 90 generically represents the plurality of system, peripheral, and/or chipset buses, and/or all other circuitry enabling the communication between processor(s) 82 and the rest of the hardware components of appliance 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 83, and/or a southbridge connecting processor 82 to devices 84, 85, 86, and 87.

The exemplary systems and methods described above facilitate the management of RPA robots by providing a user-friendly interface for changing default characteristics of an RPA resource (e.g., file, queue, database, set of credentials, etc.) virtually at any time. Editable characteristics include, for instance, a name, a location, and a version of the respective resource, among others. Such changes are then propagated to all robots executing workflows that require access to the respective resource. Crucially, some embodiments enable the user to apply the respective changes without having to modify the specification of a workflow that uses the respective resource.

In a typical RPA scenario, an RPA developer uses a robot design application to construct a software robot configured to carry out a sequence of activities, such as extracting structured data from a collection of invoices, parsing and organizing incoming email, etc. A specification of the respective robot is then transmitted to the respective RPA client, which may be a large corporation with a complex computing infrastructure. Frequently, the respective RPA client operates a robot orchestrator configured to manage the execution of multiple robots and workflows. Some RPA workflows require accessing various resources, such as files, queues, credentials, etc. However, the developer of the respective robot does not, and should not, know the location of the client's files, or have the credentials to access them. Therefore, in conventional RPA, a client-side IT professional such as an orchestrator administrator is typically tasked with adapting the received robot specification to the local infrastructure.

However, altering the robot specification may require substantial in-house knowledge of RPA in general, and of the robot design software in particular, i.e., skills well beyond those of the average IT professional. Alternatively, making changes to the robot may require collaborating with the robot developer, a process which may be slow and impractical.

Some embodiments facilitate the client-side management of software robots by enabling a client-side user to manage RPA resources independently of the robot specification, and by providing a user-friendly user interface for the client-side management or RPA resources. Some embodiments add new features to an orchestrator UI, conveniently bringing together RPA resource management with other aspects of robot management such as scheduling and monitoring, among others.

In conventional RPA, an attempt to execute a robot workflow 'out of the box' may fail because a resource required for execution is missing or misconfigured. Furthermore, client-side RPA user interfaces are typically oblivious to the reasons of such malfunctions, beyond maybe displaying generic error messages such as 'file not found'. The robot may arrive pre-configured to look for specific resources (e.g., files, queues) at a default location set by the developer at design time, but conventional runtime interfaces may not display such information to a user. Therefore, a client-side operator trying to adapt the respective workflow to the particularities of the local computing environment may struggle to discover the types of resources the respective workflow requires, and how they should be configured for a successful operation.

In contrast to such conventional RPA, some embodiments provide a resource management interface listing all resources required by a selected workflow, and additionally displaying an availability indicator showing whether a runtime instance of the respective resource is currently available. Such information facilitates understanding of the requirements and configuration options of the respective workflow, without the need for additional documentation. Furthermore, the resource availability information may be displayed in preparation for executing the respective workflow, allowing the client-side user to anticipate and address potential problems proactively, instead of reacting to a malfunction.

In some embodiments, the resource management interface further exposes a set of controls for creating missing resources (e.g., uploading a required file to a default location, creating a queue and/or a credential object, configuring a VPN channel to a remote resource, etc.). Some embodiments further expose resource-editing UI controls enabling the client-side user to change various characteristics of selected RPA resources, such as a filename, a user-facing name (i.e., the label/name of the resource as displayed within the respective UI), and a location of the respective resource. The user may for instance rename a resource using a more informative name than the one chosen by the developer at design-time. Relocating the respective resource may substantially facilitate adapting the respective workflow to the local computing environment: the client-side user may simply redirect the robot to virtually any storage location, instead of having to use the default location(s) chosen by the developer at design time. This user-friendly resource relocation mechanism may for example allow executing distinct instances of the same workflow on distinct target files/folders, all without having to change the specification of the respective workflow.

Some embodiments implement the resource-editing mechanism by maintaining a mapping between default characteristics of each resource (i.e., characteristics such as a filename and a location chosen by the developer at design time) and runtime characteristics of the respective resource (i.e., characteristics of a runtime instance of the respective instance, which may be edited by the client-side user). In some embodiments, the executing robot may communicate with the orchestrator via a message exchange, wherein the robot sends a request formulated according to default characteristics of a selected resource. In response, the orchestrator may expose the mapping to the robot, thereby enabling the robot to determine the runtime characteristics of the respective resource.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to execute a robotic process automation (RPA) orchestrator configured to manage a plurality of software robots and further configured to:
   receive an RPA package comprising an encoding of an RPA workflow and an indicator of a default location of an RPA resource required by the RPA workflow, wherein the RPA resource is selected from a group consisting of a computer file, a queue, and a database;
   expose an orchestrator user interface (UI) to a user, the orchestrator UI enabling the user to configure an execution of the RPA workflow; and
   assign the RPA workflow for execution to a selected robot of the plurality of software robots, wherein assigning the RPA workflow to the selected robot comprises, in preparation for executing the RPA workflow:
      determining whether a runtime instance of the RPA resource is located at the default location, and
      in response, if no, display within the orchestrator UI a resource availability indicator indicating that the runtime instance of the RPA resource is missing.

2. The method of claim 1, wherein the RPA orchestrator is further configured to maintain a mapping between a set of default characteristics of the RPA resource and a set of runtime characteristics of the RPA resource, wherein:
   default characteristics are determined according to a content of the RPA package and include the default location of the RPA resource;
   runtime characteristics characterize the runtime instance of the RPA resource and include a location of the runtime instance; and
   the mapping associates the default location with the location of the runtime instance.

3. The method of claim 2, wherein the RPA orchestrator is further configured to:
   determine the location of the runtime instance of the RPA resource according to the mapping; and
   transmit an indicator of the location of the runtime instance to the selected robot.

4. The method of claim 3, wherein the RPA orchestrator is further configured to:
   identify another robot of the plurality of software robots according to whether another workflow assigned for execution to the other robot requires the RPA resource; and
   in response, transmit the indicator of the location of the runtime instance to the other robot.

5. The method of claim 2, wherein the RPA orchestrator is further configured to expose the mapping to the selected robot.

6. The method of claim 2, wherein the orchestrator UI is further configured to display a resource editing control enabling the user to input the location of the runtime instance of the RPA resource.

7. The method of claim 6, wherein activating the resource editing control causes the RPA orchestrator to:
   identify another robot of the plurality of software robots according to whether another workflow assigned for execution to the other robot requires the RPA resource; and
   in response, display a warning message to the user, the message comprising an identifier of the other workflow or an identifier of the other robot.

8. The method of claim 2, wherein:
   default characteristics further include a default filename of the RPA resource;
   runtime characteristics further include a filename of the runtime instance of the RPA resource;
   the mapping associates the default filename with the filename of the runtime instance; and
   the orchestrator UI is further configured to display a resource editing control enabling the user to input the filename of the runtime instance.

9. The method of claim 2, wherein the orchestrator UI is further configured to display a resource editing control enabling the user to upload a copy of the RPA resource to the location of the runtime instance.

10. A computer system comprising at least one hardware processor configured to execute an RPA orchestrator configured to manage a plurality of software robots and further configured to:
   receive an RPA package comprising an encoding of an RPA workflow and an indicator of a default location of an RPA resource required by the RPA workflow, wherein the RPA resource is selected from a group consisting of a computer file, a queue, and a database;

expose an orchestrator user interface (UI) to a user, the orchestrator UI enabling the user to configure an execution of the RPA workflow; and assign the RPA workflow for execution to a selected robot of the plurality of software robots, wherein assigning the RPA workflow to the selected robot comprises, in preparation for executing the RPA workflow:

determining whether a runtime instance of the RPA resource is located at the default location, and in response, if no, displaying within the orchestrator UI a resource availability indicator indicating that the runtime instance of the RPA resource is missing.

11. The computer system of claim 10, wherein the RPA orchestrator is further configured to maintain a mapping between a set of default characteristics of the RPA resource and a set of runtime characteristics of the RPA resource, wherein:

default characteristics are determined according to a content of the RPA package and include the default location of the RPA resource;

runtime characteristics characterize the runtime instance of the RPA resource and include a location of the runtime instance; and the mapping associates the default location with the location of the runtime instance.

12. The computer system of claim 11, wherein the RPA orchestrator is further configured to:

determine the location of the runtime instance of the RPA resource according to the mapping; and transmit an indicator of the location of the runtime instance to the selected robot.

13. The computer system of claim 12, wherein the RPA orchestrator is further configured to:

identify another robot of the plurality of software robots according to whether another workflow assigned for execution to the other robot requires the RPA resource; and in response, transmit the indicator of the location of the runtime instance to the other robot.

14. The computer system of claim 11, wherein the RPA orchestrator is further configured to expose the mapping to the selected robot.

15. The computer system of claim 11, wherein the orchestrator UI is further configured to display a resource editing control enabling the user to input the location of the runtime instance of the RPA resource.

16. The computer system of claim 15, wherein activating the resource editing control causes the RPA orchestrator to:

identify another robot of the plurality of software robots according to whether another workflow assigned for execution to the other robot requires the RPA resource; and in response, display a warning message to the user, the message comprising an identifier of the other workflow or an identifier of the other robot.

17. The computer system of claim 11, wherein:

default characteristics further include a default filename of the RPA resource;

runtime characteristics further include a filename of the runtime instance of the RPA resource;

the mapping associates the default filename with the filename of the runtime instance; and the orchestrator UI is further configured to display a resource editing control enabling the user to input the filename of the runtime instance.

18. The computer system of claim 11, wherein the orchestrator UI is further configured to display a resource editing control enabling the user to upload a copy of the RPA resource to the location of the runtime instance.

19. A non-transitory computer-readable medium storing instructions which, when executed by at least one hardware processor of a computer system, cause the computer system to execute an RPA orchestrator configured to manage a plurality of software robots and further configured to:

receive an RPA package comprising an encoding of an RPA workflow and an indicator of a default location of an RPA resource required by the RPA workflow, wherein the RPA resource is selected from a group consisting of a computer file, a queue, and a database;

expose an orchestrator user interface (UI) to a user, the orchestrator UI enabling the user to configure an execution of the RPA workflow; and assign the RPA workflow for execution to a selected robot of the plurality of software robots, wherein assigning the RPA workflow to the selected robot comprises, in preparation for executing the RPA workflow:

determining whether a runtime instance of the RPA resource is located at the default location, and in response, if no, displaying within the orchestrator UI a resource availability indicator indicating that the runtime instance of the RPA resource is missing.

20. The method of claim 1, wherein the indicator of the default location is an identifier of a filesystem folder.

21. The computer system of claim 10, wherein the indicator of the default location is an identifier of a filesystem folder.

* * * * *